Oct. 25, 1955

A. D. NUSBAUM 2,721,775

EXTERNAL SELF-RETAINING NEEDLE BEARING

Filed Sept. 14, 1953

ALAN D. NUSBAUM.
INVENTOR.

BY Eugene C. Knoblock

ATTORNEY.

United States Patent Office 2,721,775
Patented Oct. 25, 1955

2,721,775

EXTERNAL SELF-RETAINING NEEDLE BEARING

Alan D. Nusbaum, Bremen, Ind.

Application September 14, 1953, Serial No. 380,011

9 Claims. (Cl. 308—212)

This invention relates to an external self-retaining needle bearing.

Large numbers of needle bearings are used in industry and in different types of mechanisms, such as universal joints, automotive transmissions, and the like. Where external bearings are concerned, that is, bearings having needle elements located around the exterior of a carrier sleeve, it has usually been necessary to provide some external means separate from the carrier to hold the bearing elements in proper relation on the carrier or to use needle roller elements having a reduced dimension or conical end parts engageable in grooves in a carrier to hold the individual elements in place. These conditions, of course, apply in connection with bearings which constitute preassembled units which can be handled, shipped and installed as preassembled units, rather than being fabricated or assembled within the environment of intended use. Such assembly of bearings as a part of an assembly of a machine in which the bearing is used is costly and time-consuming and has many disadvantages as compared to a bearing of this type which can be preassembled and installed in a machine as a unit. Up to this time, to the best of my knowledge and belief, no satisfactory external self-retaining needle bearing of the type using plain needle bearing elements, that is, substantially cylindrical members having rounded ends, has been available commercially or patented.

It is the primary object of this invention to provide an external self-retaining needle bearing so constructed that individual bearing elements of the type having a cylindrical body of uniform diameter with rounded ends, may be retained in operative relation after assembly without the use of means external of the needle bearing elements and their carrier.

A further object is to provide an external self-retaining bearing utilizing needle bearing elements having cylindrical body portions of substantially uniform diameter with rounded ends, which fit at one end thereof within an annular grooved retainer projecting laterally outwardly from a carrier member whose opposite end mounts an out-turned flange engageable by the opposite ends of the needle members to restrain them against axial displacement.

A further object is to provide a bearing construction in which all but a small portion of the total length of each needle bearing element is utilized for anti-friction purposes and wherein the retained or positioning portion of each needle bearing element is located at one end thereof only.

Other objects will be apparent from the following specification.

Figure 1:
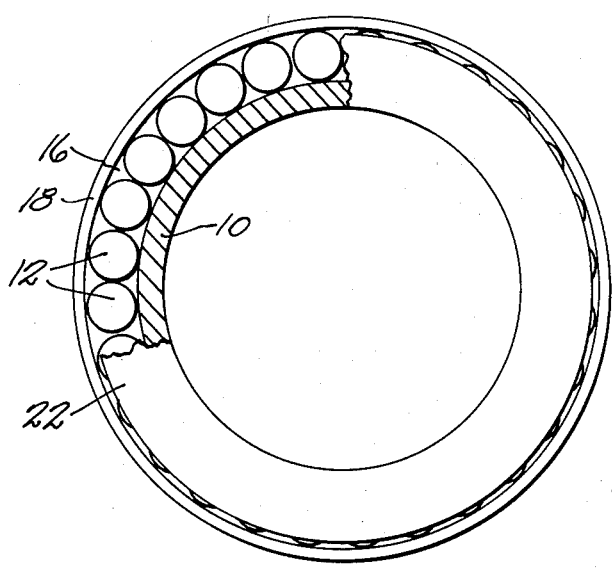
Fig. 1 is an end view of a bearing constituting one embodiment of my invention with parts broken away and shown in section.
Figure 2:
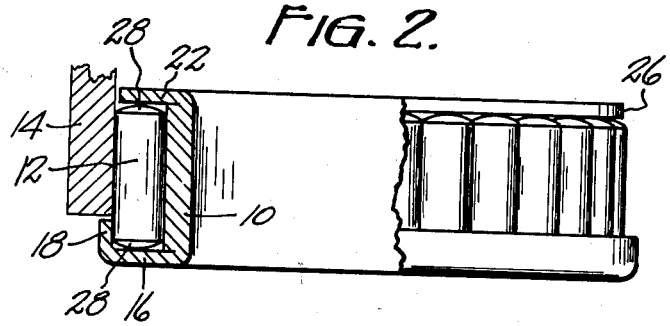
Fig. 2 is a side view of a bearing with parts shown in section.
Figure 3:
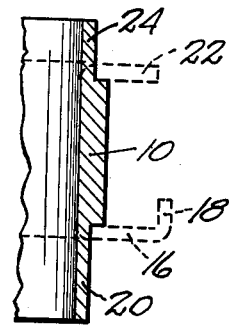
Fig. 3 is a fragmentary view illustrating the cross-sectional shape of a ring member from which the bearing carrier of the bearing illustrated in Figs. 1 and 2 is constructed.

Referring to the drawing which illustrates several embodiments of the invention, and particularly the embodiment illustrated in Figs. 1, 2 and 3, the numeral 10 designates a tubular portion of a bearing carrier around which a plurality of needle bearing elements 12 are arranged to fit within the socket portion 14 of a machine element of any suitable construction in such a manner that the member 10 and any part carried thereby or fitting therein will be free to rotate within that socket.

The carrier member 10 is preferably constructed as illustrated in Figs. 2 and 3, having formed integrally therewith at one end a substantially planar outwardly projecting flange portion 16 from whose outer end projects a substantially cylindrical return bent flange portion 18. The portions 16 and 18 are preferably integral with each other and with the portion 10 and may be formed from the blank portion 20 of a ring, as shown in Fig. 3, the same being of reduced thickness and being bent outwardly at its junction with the part 10 to provide the planar portion 16, and thence being return bent at 18. The inner cylindrical surface of the flange 18 will be substantially uniformly spaced from the outer cylindrical surface of the part 10 to provide an annular groove of substantially uniform width throughout its depth and of a width dimensioned to receive the needle bearing members 12 with slight clearance, and preferably a clearance in the order of .002 inch. It will be understood that this clearance is illustrative and is not intended to be limiting, although clearances of .005 inch represent approximately the maximum clearance permissible. The depth of the groove defined by the parts 10, 16 and 18 will preferably be approximately equal to the diameter of the roller or needle bearing elements 12 although this dimension is approximate and may vary as the clearance varies. Thus, the smaller the clearance of the needles within the groove, the shallower may be the groove, and vice versa. The groove in each case should be of such depth that it restrains outward lateral tilting of the bearing elements to such an extent that the bearing elements may not fall from or be released from the groove.

The end of the carrier opposite that carrying the groove forming parts 16 and 18 has a substantially planar outturned flange 22 which is so spaced at its innermost face from the inner face of the planar flange 16 as to receive a needle bearing element with slight clearance, that is, a clearance of from .002 inch to .005 inch approximately. The flange 22 may be formed by spinning or bending outwardly to planar form the reduced thickness portion 24 integral with the tubular wall part 10 as seen in Fig. 3. The outer diameter of the planar flange 22, that is, its diameter at its outer edge 26, is less than the diameter of the inner face or surface of the groove forming part 18. In this connection the dimension of the part 26 will preferably be such that said edge 26 will lie inwardly of the cylindrical outline represented by the outermost points of the needle bearing members 12 and its diameter is less than the diameter of the socket 14 into which the bearing member is adapted to fit.

The bearing may be constructed in any manner found suitable and, while the integral formation of the groove forming parts 16 and 18 and of the flange part 22 is preferred, it will be understood that annular members or rings may be formed separately from the tubular carrier portion 10 and applied thereto by brazing, soldering, welding or the like, to form the annular groove 16—18 and retainer 22.

The assembly of the bearing may be accomplished in any manner found suitable, and one such manner will be to load a carrier having its groove portions 16 and 18 fully formed but having its flange portion 22 either unformed or unapplied. Such a carrier member may be inserted substantially concentrically within a socket so that the individual roller bearing members 12 may be applied in the space between the socket and the wall 10 to seat in the annular retainer groove 16—18. Thereupon, while the parts are so held, the flange 22 may be spun outwardly to desired form or otherwise applied thereto. When the flange 22 has been properly positioned and oriented, the bearing parts become an assembled self-retaining bearing which may be removed, handled and manipulated as an individual unit.

The bearing assembly makes use of a simple form of needle bearing having a substantially cylindrical body of uniform dimension throughout its length with rounded or part-spherical end surfaces 28. Such bearing elements can be constructed simply and inexpensively, and because of their end crown will have minimum frictional engagement with the parts which retain them in selected position, that is, in a position preventing endwise displacement thereof. The substantially parallel side walls of the retainer grooved being spaced only slightly more than the diameter of the roller body and being of a height or depth to extend longitudinally of the roller for a portion of its cylindrical portion, serve to position the individual bearing members against radial outward tilting. Assuming that the number of bearing elements is such that the groove is substantially completely filled by the bearing elements, that is, so that the adjacent bearing elements are close to each other so as to be prevented from tilting in a tangential direction, the construction will be such as to hold each of the bearing elements in its operative position. Stated differently, the outer flange 18 retains the bearing elements against radial outward tilting while the individual bearing elements retain each other against tangential tilting to release or release from the retainer groove. Hence external retainer means are not required. At the same time the proportion of the total length of the bearing element required for retention purposes is small, and the major portion of the length thereof is effective for anti-friction purposes.

Figure 4:
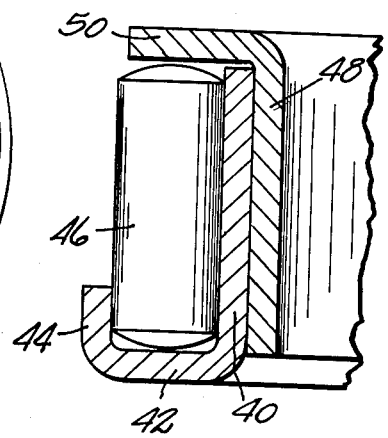
Fig. 4 is an enlarged fragmentary sectional view illustrating a modified embodiment of the invention.

An alternative construction of the bearing is illustrated in Fig. 4, wherein the carrier is formed from two parts which interfit to define a member of substantially C-shape cross-section as seen in Fig. 4. One of these parts comprises a tubular member 40 having a substantially annular planar portion 42 projecting outwardly therefrom and in turn carrying a substantially cylindrical tubular flange portion 44. Thus the cross-sectional shape of the parts 42, 44 is substantially the same as the letter J, and the confronting surfaces of the two parts 40 and 44 are concentric and uniformly spaced with the spacing therebetween constituting substantially the dimension of the roller bearing elements 46 plus whatever small clearance is desired, that is, a clearance in the order of .002 inch to .005 inch. The length of the part 40 will be substantially equal to the overall dimension of each bearing element 46. A second carrier part comprises a tubular member 48 whose outer diameter is substantially equal to the inner diameter of the part 40 so as to have a snug fit therein, such as a press fit. A retainer flange 50, preferably of planar annular form, projects outwardly from one end of the part 48. The parts are pressed together into the assembled relation shown in Fig. 4, wherein the confronting faces of the parts 42 and 50 are spaced a distance slightly greater than the overall length of the bearing elements 46. It will be observed that the outer surface of the cylindrical or tubular part 40 constitutes the race surface upon which the roller elements 46 rotate, that the flange 44 constitutes the retainer which holds the bearing elements 46 against outward tilting, and that the flange 50 prevents the bearing elements 46 from endwise displacement.

The parts 40 and 48 which fit together telescopically in the assembly of the bearing may be so proportioned and dimensioned that they will maintain their proper orientation and relation by a simple press fit thereof. If desired, however, they may be brazed, welded, soldered or otherwise held together to form a single unit.

One of the advantages of this construction is that the parts of the carrier are formed from metal of thin gauge and substantially uniform cross-sectional dimension throughout. At the same time, because of the double thickness at the parts 40 and 48, adequate strength, rigidity and solidity of the roller engaging surface is provided. This embodiment of the invention possesses all of the advantages of the embodiment previously mentioned, and possesses additional advantage in that no forming or bending of metal is required incident to the assembly of the bearing. Instead, the bearing elements 46 may be mounted in place within the part 40, 42, 44, and thereupon the part 48—50 may be applied in order to hold the unit in assembled condition. Another advantage of the construction of Fig. 4 is that only the roller engaging surfaces need be hardened, that is, the external surface of the part 40. This accomplished simply with the multi-part construction of Fig. 4 by simply hardening the part 40 or the part 40—42—44 without requiring that the other part 48—50 be similarly hardened.

One of the interesting characteristics of both embodiments of this invention is that the lip or annular outer flange, that is, the annular flange 18 of the first embodiment or the annular flange 44 of the second embodiment, serve only to retain needles in the bearing until the bearing is installed. A characteristic of installation will be that the machine socket in which the bearing rotates, such as the socket 14, will have an inner diameter which is slightly smaller than the inner diameter of the lip 18. Stated differently, the tolerance of the socket 14 will be less than the tolerance of the flange 18 or 44. Thus, if the minimum tolerance of the flange 18 is .002 inch, then the maximum tolerance of the socket will be less than .002 inch or preferably in the order of .0015 inch. As a result of this relationship, after the bearing has been installed within the socket of the mechanism, that is, within the socket 14, that socket will hold the needle bearing element 12 clear of the flange 18 or 44. Thus the flanges 18, 44 serve no function after the bearing has once been installed in place. Their principal function is to hold the bearing elements within the bearing assembly before installation of the bearing or after removal of the bearing.

Insofar as tolerances against endwise play are concerned, attention is directed to the fact that needle bearings are commonly manufactured to have a permissible end tolerance of —.015 inch to —.02 inch. In other words, needle bearings are specified to be of a predetermined length and to have a minus tolerance only and no plus tolerance. Needle bearings are constructed inexpensively when in high production, and, because of the tolerances mentioned, the needle bearing elements in any given bearing may be of different lengths. Hence the end tolerance between the parts 16 and 22 must be greater than the maximum bearing length by the desired tolerance limits in the nature of .002 inch to .005 inch. This will, of course, mean that with respect to the shorter bearings the tolerances may be as great as .025 inch. This large tolerance can well be accommodated by the present construction without disadvantage or sacrifice of accuracy, cost or other advantage of the bearing.

While the preferred embodiments of the invention have been illustrated and described, it will be understood that changes in the construction may be made within the scope of the appended claims without departing from the spirit of the invention.

I claim:

1. An external self-retaining needle bearing comprising a carrier having a cylindrical portion, an annular grooved portion having a substantially cylindrical large diameter inner surface, concentric with and encircling one end of said cylindrical portion and an annular outturned retainer carried by the other end of said cylindrical portion, and a plurality of cylindrical needle bearing members having rounded ends, one end portion of each bearing member including a cylindrical portion inward of said rounded bearing end fitting snugly and rotatably in said grooved portion, said needle bearing members being retained against endwise release from said grooved member by said outturned retainer.

2. An external self-retaining needle bearing comprising a carrier having a cylindrical portion and a plurality of needle bearing members arranged parallel to each other in a series encircling said cylindrical portion, said carrier having an end portion defining an annular groove receiving the end portion of each bearing element and having an inner substantially cylindrical surface, said carrier having an opposite outturned end portion overlying portions of the ends of said bearing elements opposite the end portions received in said groove.

3. An external self-retaining needle bearing comprising a carrier having a cylindrical portion, a return bent annular member at one end of said cylindrical portion having an inner substantially cylindrical surface spaced from said cylindrical portion, a plurality of needle bearing members fitting snugly and rotatably in said annular member, and an outwardly projecting member at the opposite end of said cylindrical portion for retaining said bearing members against endwise displacement.

4. An external self-retaining needle bearing comprising a carrier having a cylindrical portion and laterally outwardly projecting annular portions at opposite ends of said cylindrical portion, and a plurality of needle bearing members arranged around said cylindrical portion between said annular portions, one of said annular portions including an annulus having a substantially cylindrical inner surface concentric with said cylindrical portion and encircling said needle bearing members for a portion of their length to limit outward tilting of said needle bearings relative to said carrier, said annular portions cooperating to limit endwise movement of said needle bearing members.

5. An external self-retaining needle bearing as defined in claim 4 wherein said tilt-limiting annular portion defines an annular groove in which said bearing members have a slight rotation-accommodating clearance only.

6. An external self-retaining needle bearing as defined in claim 4, wherein said tilt-limiting annular portion defines an annular groove of a depth substantially equal to the diameter of said bearing members.

7. An external self-retaining needle bearing as defined in claim 4, wherein said annular portions are formed integrally with and are of thinner cross-section than said cylindrical portions.

8. An external self-retaining needle bearing as defined in claim 4, wherein said carrier is formed of two parts, each part including one of said annular portions.

9. An external self-retaining needle bearing as defined in claim 4, wherein said carrier is formed of two tubular parts interfitting to define said cylindrical portion, each tubular part mounting one of said annular portions.

References Cited in the file of this patent

UNITED STATES PATENTS 2,063,787   Brown _____ Dec. 8, 1936